United States Patent
Bromand et al.

(10) Patent No.: US 12,248,735 B2
(45) Date of Patent: *Mar. 11, 2025

(54) HUMAN-MACHINE INTERFACES FOR UTTERANCE-BASED PLAYLIST SELECTION

(71) Applicant: Spotify AB, Stockholm (SE)

(72) Inventors: Daniel Bromand, Stockholm (SE); Richard Mitic, Stockholm (SE); Horia-Dragos Jurcut, Hägersten (SE); Henriette Susanne Martine Cramer, San Francisco, CA (US); Ruth Brillman, Somerville, MA (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,173

(22) Filed: Jul. 26, 2023

(65) Prior Publication Data
US 2023/0393812 A1    Dec. 7, 2023

Related U.S. Application Data

(63) Continuation of application No. 17/720,486, filed on Apr. 14, 2022, now Pat. No. 11,755,283, which is a
(Continued)

(30) Foreign Application Priority Data

Jul. 18, 2018  (EP) ..................... 18184291

(51) Int. Cl.
G10L 15/22     (2006.01)
G06F 3/16      (2006.01)
(Continued)

(52) U.S. Cl.
CPC .............. G06F 3/167 (2013.01); G10L 15/22 (2013.01); G10L 15/26 (2013.01); *G06F 16/639* (2019.01); *G10L 2015/223* (2013.01)

(58) Field of Classification Search
CPC ....... G06F 16/639; G06F 3/167; G10L 15/30; G10L 15/22
See application file for complete search history.

(56) References Cited

U.S. PATENT DOCUMENTS 7,779,357 B2   8/2010   Naik
8,458,197 B1   6/2013   Procopio
(Continued)

FOREIGN PATENT DOCUMENTS

EP    2214175       8/2010
WO    2007/022533   2/2007

OTHER PUBLICATIONS

European Decision to Refuse the Applications in Application 18184291.5, mailed Dec. 23, 2022, 1 page.
(Continued)

*Primary Examiner* — Feng-Tzer Tzeng
(74) *Attorney, Agent, or Firm* — McDonnell Boehnen Hulbert & Berghoff LLP

(57) ABSTRACT

Systems, methods, and devices for human-machine interfaces for utterance-based playlist selection are disclosed. In one method, a list of playlists is traversed and a portion of each is audibly output until a playlist command is received. Based on the playlist command, the traversing is stopped and a playlist is selected for playback. In examples, the list of playlists is modified based on a modification input.

20 Claims, 6 Drawing Sheets

Related U.S. Application Data continuation of application No. 16/504,892, filed on Jul. 8, 2019, now Pat. No. 11,334,315.

(51) Int. Cl.
 *G10L 15/26* (2006.01)
 *G06F 16/638* (2019.01)

(56) References Cited

U.S. PATENT DOCUMENTS

| | | | |
|---|---|---|---|
| 8,898,568 B2 | 11/2014 | Bull et al. | |
| 9,552,188 B1* | 1/2017 | Qureshey | G06F 16/639 |
| 9,591,051 B2* | 3/2017 | Prager | H04H 60/66 |
| 9,905,226 B2 | 2/2018 | Bishop et al. | |
| 11,334,315 B2 | 5/2022 | Bromand | |
| 11,755,283 B2 | 9/2023 | Bromand | |
| 2002/0045960 A1 | 4/2002 | Phillips | |
| 2003/0139654 A1* | 7/2003 | Kim | A61B 5/16 600/300 |
| 2003/0204398 A1* | 10/2003 | Haverinen | G10L 15/20 704/E15.039 |
| 2005/0062935 A1 | 3/2005 | Bubie | |
| 2006/0095848 A1 | 5/2006 | Naik | |
| 2007/0074617 A1 | 4/2007 | Vergo | |
| 2008/0208379 A1 | 8/2008 | Weel | |
| 2009/0076821 A1 | 3/2009 | Brenner et al. | |
| 2010/0064218 A1 | 3/2010 | Bull et al. | |
| 2011/0234480 A1 | 9/2011 | Fino | |
| 2013/0024195 A1* | 1/2013 | White | G06F 3/0236 704/235 |
| 2013/0138440 A1 | 5/2013 | Strope | |
| 2014/0112556 A1* | 4/2014 | Kalinli-Akbacak | G06V 40/176 382/128 |
| 2014/0278419 A1 | 9/2014 | Bishop et al. | |
| 2015/0268800 A1 | 9/2015 | O'Konski et al. | |
| 2017/0243576 A1* | 8/2017 | Millington | G10L 15/30 |
| 2018/0188945 A1 | 7/2018 | Garmark et al. | |
| 2020/0026489 A1 | 1/2020 | Bromand | |

OTHER PUBLICATIONS

European Extended Search Report from corresponding European App. No. 18184291.5 (dated Nov. 22, 2018), 12 pages.

European Office Action for EP Appln. No. 18184291.5 dated Jul. 2, 2021 (16 pages).

European Summons to Attend Oral Proceedings in Application 18184291.5, mailed Nov. 21, 2022, 17 pages.

Mallory Locklear, "Alexa can now play that song you heard but can't remember the name of," engadget (Mar. 8, 2018). Available online at: https://www.engadget.com/2018/03/08/alexa-play-song-cant-remember-name-of-/, 2 pages.

* cited by examiner

HUMAN-MACHINE INTERFACES FOR UTTERANCE-BASED PLAYLIST SELECTION

CROSS-REFERENCE TO RELATED APPLICATION

This application claims priority to and is a continuation of U.S. patent application Ser. No. 17/720,486, filed on Apr. 14, 2022, which is a continuation of U.S. patent application Ser. No. 16/504,892, filed Jul. 8, 2019, now U.S. Pat. No. 11,334,315, issued May 17, 2022, which claims priority to application Ser. No. 18/184,291.5, which was filed in Europe on Jul. 18, 2018, and which applications are incorporated herein by reference in their entirety.

TECHNICAL FIELD

The present disclosure relates to technical solutions for human-machine interfaces, particularly utterance-based human-machine interfaces for playlist management.

BACKGROUND

Human-machine interfaces that allow human-machine interactions using natural language processing are becoming ubiquitous, in recent times in the form of smart home appliances. Such appliances, however, continue to have limited capabilities because they lack the technical ability to process complex voice-based commands related to complex tasks. For example, in the domain of media content delivery, there are technical challenges in providing an utterance-based human-machine interfaces for playlist management.

Current techniques for playlist management involve providing a visual indicator of available playlists and their contents at a visual human-machine interface. But there are many situations where a visual user interface is not available, so providing an utterance-based human-machine interface for playlist management to improve the capability of a device to respond to user requests in such situations would be beneficial.

Situations where visual indicators of playlists are unavailable arises in a variety of situations, such as where a device lacks a display (e.g., as is the case in many smart home appliances). Such situations can also arise when a device has a display but the display is not readily visible to a user, such as when the user is located away from the device or when the user is engaged in an activity where the user's visual attention is elsewhere (e.g., during driving or exercising). Without access to visual indicators to aid selection of media content by a user, users can struggle to know what playlists are available and their contents.

Further, even if the user knows a particular playlist to which he or she would like to listen, the selection of that playlist can be complex as well. Playlists (especially user-created playlists) can have difficult to remember titles, creating havoc for those users without perfect memory. A user may, for example, want to cause a device to play from a playlist but may not know the specific name of the playlist.

Thus, replacing available human-machine interfaces that rely on visual indicators with utterance-based human-machine interfaces is technically challenging. In the domain of media content delivery, there exists a need for playlist management in utterance-based human-machine interfaces.

US 2009/0076821 describes a method and apparatus to control operation of a playback device. An example of the method includes controlling playback, navigation, and/or dynamic playlisting of digital content using speech. This can include the use of media metadata, which includes a number of strings that identify information regarding the media items. Phonetic metadata is associated with the number of strings of the media metadata. An automated speech recognition grammar may include a dictionary including the phonetic metadata.

US 2014/0278419 describes voice command definitions used in launching an application with a command. A voice command definition file defines voice commands for an application. The voice commands can include playlist commands, such as a "show all playlists" command and a "play playlist" command.

US 2010/0064218 describes an audio user interface. The publication discloses an audio user interface that provides audio prompts that help a user interact with an electronic device. An intelligent path can provide access to different types of audio prompts from a variety of different sources.

US 2006/0095848 describes an audio user interface for a device that generates audio prompts that help a user interact with a user interface of the device. One aspect pertains to providing the audio user interface by leveraging the computing resources of a host computer system. The host system performs process-intensive text-to-speech conversion so that the device only needs to perform the less intensive task of playing the audio file.

SUMMARY

The present disclosure provides methods, apparatuses, and computer-readable products for utterance-based human-machine interfaces for playlist management.

A method that includes receiving, by a human-machine interface of a device, a first input including a first utterance; transmitting the first utterance to a natural language understanding system; receiving, from the natural language understanding system, a list of playlists; traversing the list of playlists and audibly outputting a predetermined portion of each encountered playlist; while traversing the list of playlists, receiving a second input; determining that the second input is associated with a playlist command; and based on the playlist command: stopping the traversing; selecting a selected playlist based on the playlist command; and initiating playback of the selected playlist.

In an example, audibly outputting the predetermined portion of each encountered playlist includes vocalizing a name of the encountered playlist. In an example, audibly outputting the predetermined portion of each encountered playlist includes playing a playlist preview of the encountered playlist. In an example, the method further includes obtaining a phrase; and vocalizing the phrase prior to traversing the list of playlists. In an example, the method further includes determining that the device is in an offline mode. In an example, the playlists of the list of playlists have media content items that are locally stored at the device. In an example, the first utterance includes a descriptor. In an example, the list of playlists is modified based on the descriptor. In an example, the method further includes, while traversing the list of playlists, receiving a modification input; and modifying the list of playlists based on the modification input. In an example, the playlist command includes a play current playlist command. In an example, selecting the selected playlist includes selecting a most-recently encountered playlist. In an example, the playlist command includes a playlist identifier. In an example, selecting the selected playlist includes selecting the selected playlist based on the selected playlist being associated with the playlist identifier. In an example, the method further includes, prior to traversing the list of playlists, reordering the list of playlists based on a predicted activity of a user of the device. In an example, the method further includes, prior to traversing the list of playlists, reordering the list of playlists based on an amount of content of each playlist that are cached at the device. In an example, the second input includes second utterance data. In an example, determining that the second input is associated with the playlist command includes: transmitting the second utterance data to the natural language understanding system; and receiving, from the natural language understanding system, an indication that the second input is associated with the playlist command. In an example, receiving the second input includes determining that a tactile input device of the device was actuated.

In an example, there is a device that includes one or more processor devices; and a computer-readable medium device coupled to the one or more processor devices. The computer-readable medium device includes instructions that, when executed by the one or more processor devices, cause the one or more processor devices to perform the methods described above. In an example, the natural language understanding system is remote from the device.

BRIEF DESCRIPTION OF THE DRAWINGS

The features and advantages of the present disclosure will become more apparent from the detailed description set forth below when taken in conjunction with the following drawings.

DETAILED DESCRIPTION

Figure 1:
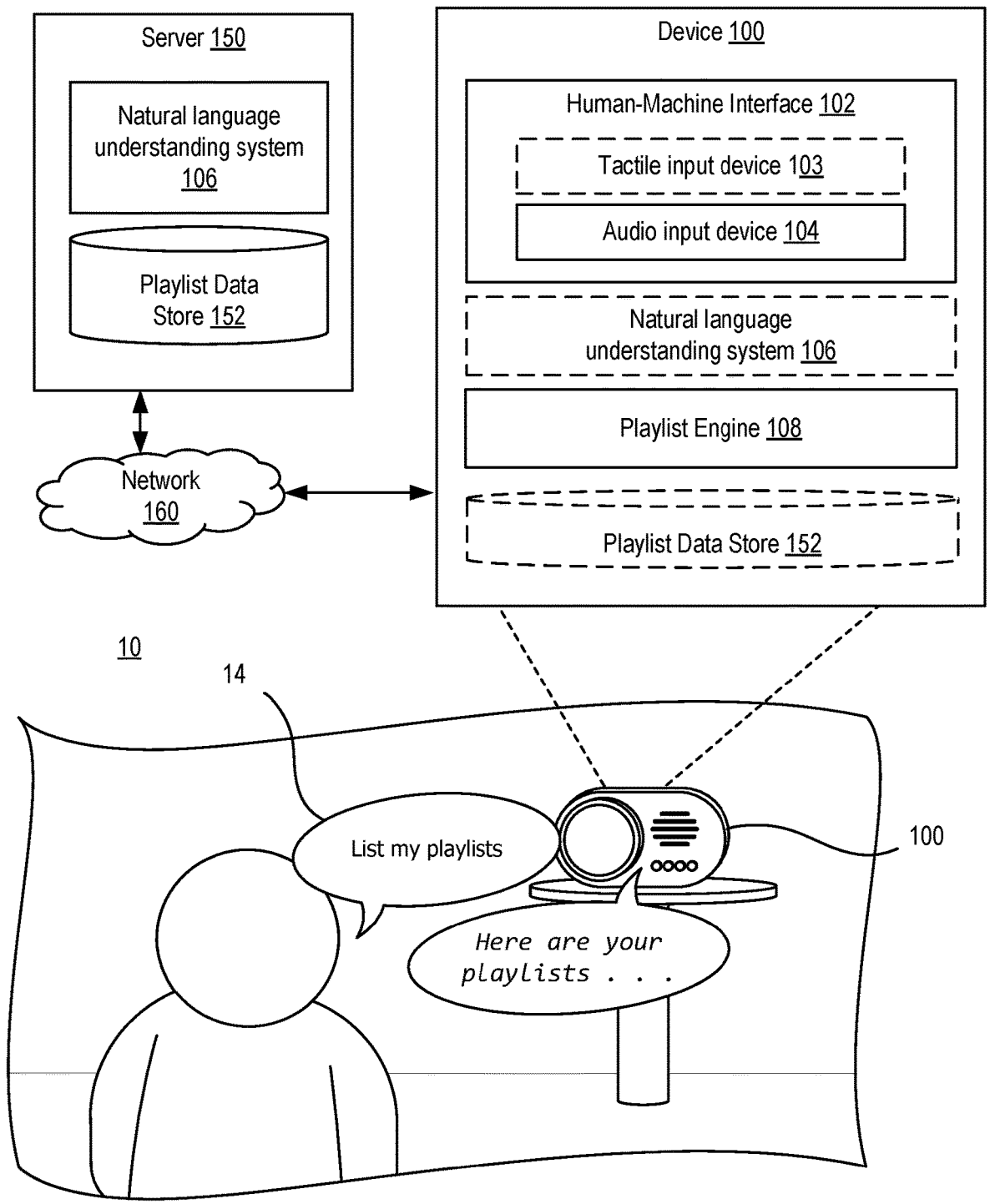
FIG. 1 illustrates an example system for providing an utterance-based human-machine interface for playlist management.

The example embodiments presented herein are directed to systems, methods, and non-transitory computer-readable medium products for utterance-based human-machine interfaces for managing one or more music playlists. This is for convenience only and is not intended to limit the application of the present invention. After reading the following description, how to implement the following disclosure in alternative embodiments will be apparent to one skilled in the relevant art. For instance, although primarily described in the domain of music, techniques herein are applicable to other kinds of playlists, such as playlists of other audio content (e.g., audiobooks or podcasts), video content (e.g., shows or movies), game content (e.g., video games), and virtual reality content, among other content.

A playlist is a data structure describing one or more media content items to be played. In many examples, a playlist is a customizable, ordered list of predetermined media content items. Playlists typically include identifiers of the media content items contained therein, such as uniform resource identifiers or paths to files. Playlists often include metadata regarding each media content item described therein, such as the title of a media content item and a length of the media content item. In examples, playlists include a title (e.g., "Beach Mix") and a description (e.g., "Songs to listen to at the beach"). Playlists can take a variety of different forms. Example formats for playlists include the PLS format and the M3U format, among others.

A media content item is an item of media content, such as an audio content item, a video content item, or other types of media content, which may be stored in any format suitable for storing media content. Non-limiting examples of media content items include songs, albums, audiobooks, music videos, movies, television episodes, podcasts, other types of audio or video content, and portions or combinations thereof.

One example technique relevant to addressing playlist management challenges in utterance-based human-machine interfaces involves audibly providing playlist previews and playing a specific playlist responsive to receiving a playlist command. In an example, there is a method that includes receiving an utterance via a human-machine interface of a device. For instance, the utterance may be: "list my playlists". The utterance is sent to a natural language understanding system. In turn, the device receives a list of playlists based on the utterance from the natural language understanding system. The device begins traversing the list of playlists and audibly outputs a predetermined portion of each encountered playlist. In an example, the device vocalizes a name of the encountered playlist. In another example, the device plays a preview of the encountered playlist. While traversing the list of playlists, the device receives a playlist command (e.g., from a user via a user interface) and initiates playback of a playlist based on the playlist command. The playlist command is, for example, based on receiving an utterance commanding the media playback device to play the playlist that is currently being previewed.

Additional techniques can be used to facilitate the previewing of playlists. For instance, some users may have a large number of playlists. While visual user interfaces can display a list containing a large number of media content items in a manner that is relatively easy for a user to consume, audibly previewing a large number of playlists can be inefficient. In some examples, this inefficiency can be addressed by filtering the list of playlists prior to the previewing. In some examples, this inefficiency can be addressed by filtering the list of playlists during the previewing. In some examples, the utterance includes a descriptor (e.g., jazz) and the list of playlists is filtered based on the descriptor (e.g., the list is of jazz playlists). In this manner, the device reduces the number of irrelevant playlists, which reduces an amount of time and computing resources (e.g., processor cycles, memory, bandwidth, etc.) that would otherwise be consumed to preview irrelevant playlists.

In some examples, the list of playlists is modified (e.g., filtered) to conserve computing resources. In an example, the device is in an offline mode and the list of playlists is a list of playlists having media content items that are locally stored at the media playback device. The list of playlists is reordered based on how many media content items of the playlists are cached at the media playback device to improve an experience of a user by encouraging users to select a playlist having more media content items available for playback in the offline mode. Such techniques can further be applied to improve resource consumption and conserve resources even when the device is not operating in an offline mode. By encouraging users to select a playlist having more cached media content items (e.g., by previewing those playlists before playlists having fewer cached media content items), those playlists are more likely to be played, thereby overall reducing computing resources (e.g., battery and bandwidth, primarily) used to fetch non-cached media content items.

System for Utterance-Based Human-Machine Interface for Playlist Management

FIG. 1 illustrates an example system 10 for providing an utterance-based human-machine interface for playlist management. The system includes a device 100 that is connected to a server 150 over a network 160. The device 100 and the server 150 include various components usable to perform one or more operations described herein, including performing playlist management operations based on an utterance 14 received from a user.

The device 100 is a computing device operable to cause playback of media content items based on utterances 14 received over the human-machine interface 102. In many examples, the device 100 includes one or more processor devices and a computer-readable medium device coupled to the one or more processor devices. The computer-readable medium device includes instructions that, when executed by the one or more processor devices, cause the one or more processor devices to perform various methods or processes, such as those described herein relating to providing an utterance-based human-machine interface for playlist management and the playback of media content items. An example implementation of the device 100 is shown and described in FIG. 3, below.

The human-machine interface 102 is a portion of the system 10 that acts as an interface between the user and the device 100. The human-machine interface 102 receives input from and provides output to a user. The human-machine interface 102 can include visual components (e.g., displays for output and cameras for input), audio components (e.g., speakers for output and microphones for input), tactile components (e.g., haptic feedback actuators for output and buttons for input), and combinations thereof. In many examples described herein, the human-machine interface 102 provides an utterance-based human-machine interface by receiving an utterance 14 from a user, processing the utterance 14, and taking action in response thereto. In some instances, providing the response includes providing an audible output. In many examples, the human-machine interface 102 is a combination of hardware and software components.

In the illustrated example of the human-machine interface 102, the human-machine interface 102 includes or is communicatively-coupled to an audio input device 104. The audio input device 104 is one or more devices configured to receive or obtain audio and to provide a representation of the audio (e.g., as an audio clip or audio file) as output. Typically, the audio input device 104 includes at least one microphone.

Optionally, the human-machine interface 102 is communicatively-coupled to (e.g., includes) a tactile input device 103. The tactile input device 103 includes one more tactile input mechanisms, such as buttons, levers, switches, knobs, keypads, or other input devices.

The human-machine interface 102 cooperates with a natural language understanding system 106 to process the utterance 14 and provide a response thereto. An example process 400 usable by the natural language understanding system 106 for providing functionality based on the utterance 14 is shown and described in FIG. 4.

While the device 100 typically includes the human-machine interface 102, in many examples the device 100 cooperates with the server 150 to provide some functionality, such as natural language understanding. For instance, the human-machine interface 102 receives the utterance 14 via the audio input device 104, and provides audio data representative of the utterance 14 to the natural language understanding system 106 for processing.

The device 100 further includes a playlist engine 108. The playlist engine 108 includes one or more hardware and/or software components operative to provide playlist management functionality. Playlist management functionality includes one or more of selecting playlists, previewing playlists, sorting playlists, finding playlists, identifying playlists, creating playlists, deleting playlists, and playing playlists, among other functionality. In an example, the playlist engine 108 receives a command from (or based on) the natural language understanding system 106 and executes a command based thereon. Many operations performed by the playlist engine 108 include interacting with the playlist data store 152.

The playlist data store 152 includes data regarding playlists. In an example, the playlist data store 152 includes a playlist table that stores data regarding one or more playlists. For instance, the playlist table identifies each playlist by a playlist identifier (e.g., a unique identifier, uniform resource identifier, or path to the playlist). The table includes various data regarding a corresponding playlist. Examples of such data include a playlist title (e.g., a name of the playlist given by an author of the playlist), a playlist type (e.g., user-created playlist, album, artist, genre, etc.), artist data (e.g., data regarding one or more artists associated with the playlist), genre data (e.g., data regarding one or more genres associated with the playlist), and a list of media content items associated with the playlist (e.g., the media content items contained in the playlist), among other data.

The server 150 is a computing device remote from the device 100. In many examples, the server 150 is a computing device of a media delivery system, such as a media content provider (e.g., a media streaming service). In an example the server 150 streams, progressively downloads, or otherwise communicates media content items to the device 100 for playback. In accordance with an example, the human-machine interface 102 receives an utterance 14 requesting playback of a playlist (e.g., from a user via a microphone). The natural language understanding system 106 receives data representative of the utterance 14 (e.g., from the human-machine interface 102) and provides an output that causes the server 150 to stream one or more media content items associated with a playlist to the device 100.

In many examples, the server 150 includes the natural language understanding system 106 and the playlist data store 152. In some examples, the natural language understanding system 106 and the playlist data store 152 are partially located at the device 100. In some examples, the natural language understanding system 106 and the playlist data store 152 are entirely located at the device 100. For instance, the device 100 stores data in the playlist data store 152 regarding playlists stored locally to the device 100.

Process for Utterance-Based Playlist Management

Figure 2A:
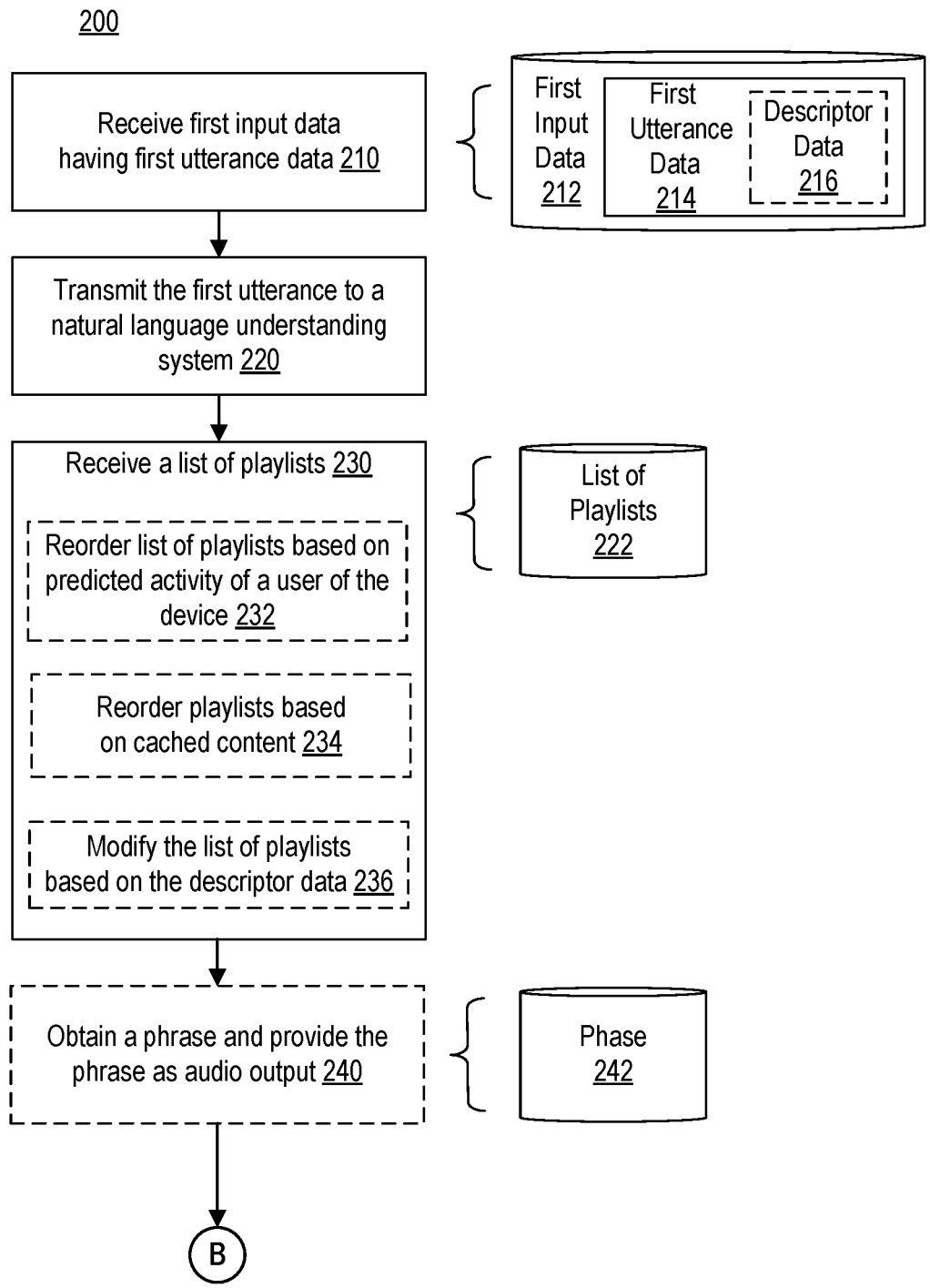
FIG. 2, which is made up of FIG. 2A, FIG. 2B, and FIG. 2C, illustrates an example process for utterance-based playlist management.
Figure 2B:
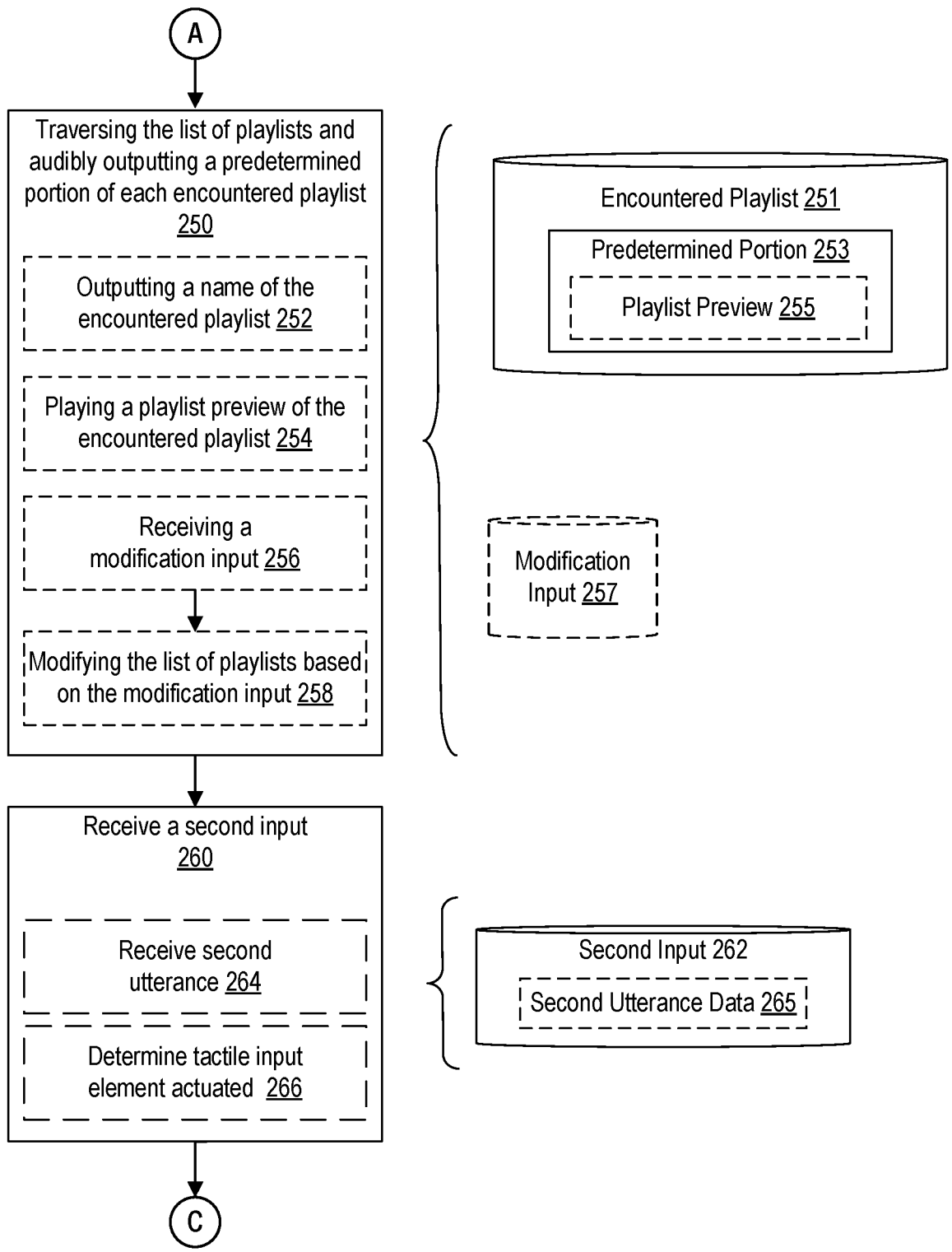
Figure 2C:
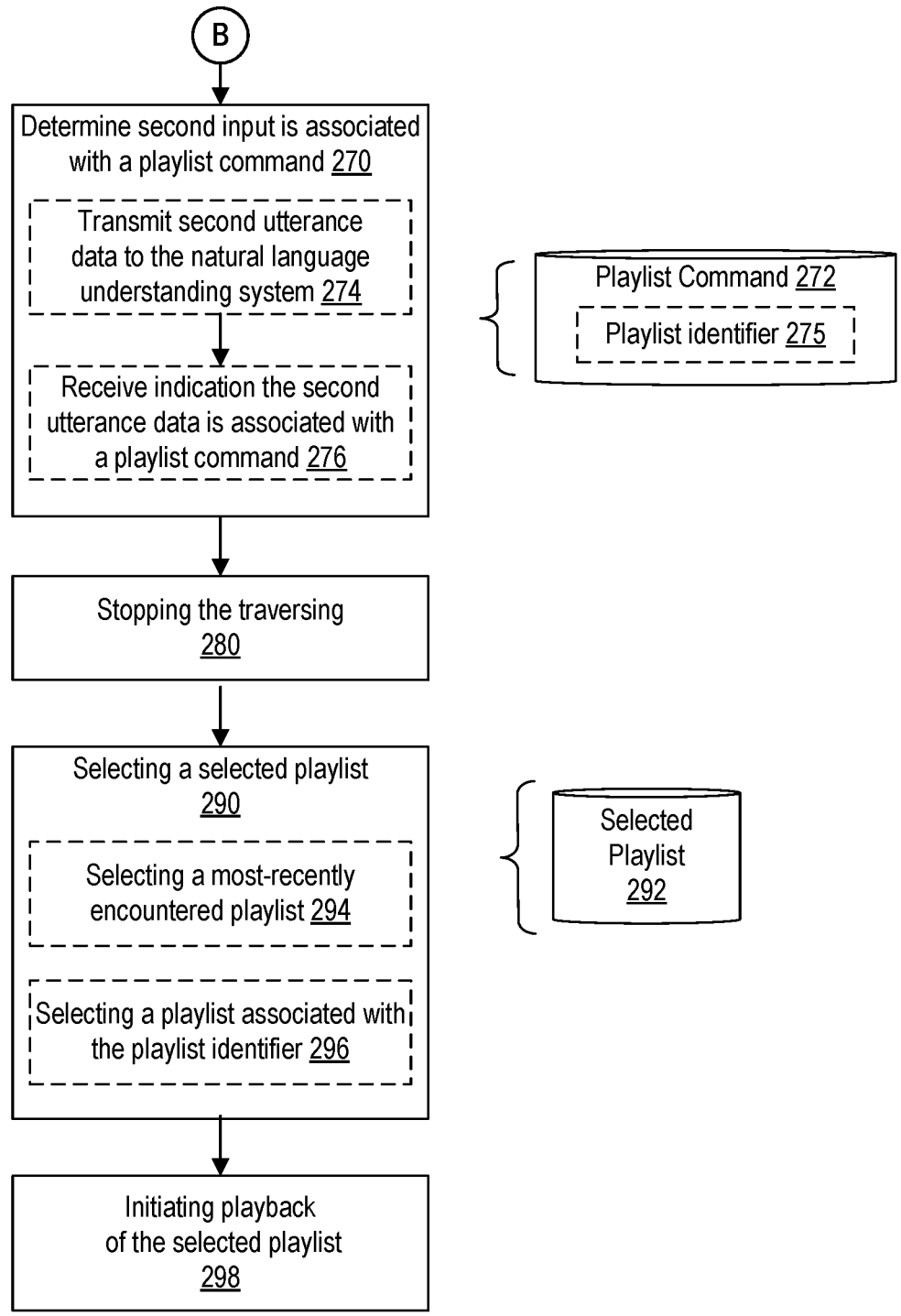

FIG. 2, which is made up of FIG. 2A, FIG. 2B, and FIG. 2C, illustrates an example process 200 for utterance-based playlist management. The process 200 is performed by various components, such as the components described above in connection with system 10. The various operations are performable by components of the device 100, components of the server 150, components of other devices, and combinations of components of the device 100, the server, and other devices. More or fewer operations may be performed in some examples. One or more of the operations may be performed by different devices. One or more of the operations may be performed in response to events, such as the completion of another operation. One or more of the operations may be performed concurrently or sequentially.

The process begins with operation 210, at which the device 100 receives (e.g., via the human-machine interface 102) a first input data 212 having first utterance data 214. The first input data 212 is data describing an input to the device 100. In various examples, the first input data 212 includes data regarding an input received by the device 100 over the human-machine interface 102, such as data from the tactile input device 103 or the audio-input device 104. In some examples, the first input data 212 includes a data packet received from another device or component of the system 10.

In the illustrated example, the first input data 212 includes first utterance data 214. The first utterance data 214 is data regarding an utterance 14. In this example, the first input data 212 includes audio data of which at least a portion is audio data regarding an utterance 14. In many examples, the first input data 212 also includes metadata describing the audio data, such as a timestamp of when the audio data was obtained, an account associated with the audio data, and a device associated with the audio data, among other data. In an example, the device 100 operates with respect to a particular account and the audio data is associated with the particular account. Optionally, the first utterance data 214 includes descriptor data 216. The descriptor data 216 is data describing a description, which will be discussed in more detail herein in relation to operation 236.

In the example process 200, the first utterance data 214 includes data describing an utterance 14 that includes a playlist-management command. In an example, the playlist-management command is a command that results in playback of a media content item from a particular playlist. In an example, the first utterance data 214 includes data describing the utterance "play from playlist". In another example, the first utterance data 214 includes data describing the utterance "preview my blues playlists", where the word "blues" is also part of the descriptor data 216.

After operation 210, the flow of the process 200 moves to operation 220.

At operation 220 the first utterance data 214 is transmitted to the natural language understanding system 106 for processing. The processing varies depending on the configuration of the natural language understanding system 106. Generally, the natural language understanding system 106 converts the first utterance data 214 into a machine-understandable form and determines an action to perform based thereon. An example process is shown and described in relation to FIG. 4.

Generally, the natural language understanding system 106 processes the first utterance data 214 and causes an action to be taken based thereon. In this example, the natural language understanding system 106 obtains two or more playlists based on the contents of the first utterance data 214. For instance, a database of playlists (e.g., a database stored as part of the playlist data store 152) is accessed based on an account associated with the device 100. The database is queried using at least some of the contents of the first utterance data 214 (e.g., using the descriptor data 216) to obtain two or more playlists. The two or more playlists are referred to herein as a list of playlists 222. As will be understood, the list of playlists 222 may take a variety of forms and need not be a list data structure. In many examples, the list of playlists 222 is a data structure describing two or more playlists, such as by including at least an identifier of the two or more playlists.

At operation 230, the list of playlists 222 is received (e.g., from or based on an output of the natural language understanding system 106). In the example process 200, the first utterance data 214 describes a playlist management command. Optionally, the list of playlists 222 is modified, such as is described in relation to operation 232, operation 234, and operation 236.

In operation 232, the list of playlists is reordered based on a predicted activity of a user of the device 100. For instance, the list of playlists 222 is reordered such that playlists relatively more suitable for a current activity of a user are before playlists that are relatively less suitable. Beneficially, reordering the list of playlists 222 in this manner decreases the amount of time needed to reach a playlist suitable for the current activity. For instance, the reordering decreases a number of playlists traversed (e.g., in operation 250, below) before a suitable playlist is reached. In at least this manner, reordering the list of playlists is based on a predicted activity of a user of the device, prior to traversing the list of playlists, is beneficial at least by decreasing the amount of computing resources consumed traversing less suitable playlists.

In an example, operation 232 includes predicting a current activity of the user. The predicting can be performed in a variety of ways, including by asking the user to describe a current activity and processing a response to the question. In other examples, the activity is predicted based on data from one or more sensors coupled to the device 100, such as an accelerometer or a GPS sensor. Output from the one or more sensors is obtained and used to determine an activity, such as running, studying, traveling, or activities.

In an example, the operation 232 further includes determining, for each playlist of the list of playlists, a similarity value describing how related the respective playlist is to the activity. In an example, the similarity value is determined based on a title, description, or tag associated with the respective playlist or the media content items contained therein. For instance, the similarity value is determined based on the name of the activity (e.g., running, driving, or studying) being contained within the title, description, or tag. In other examples, the similarity value is determined based on a vector space representation of the activity and the respective playlist (e.g., the value is equal to the cosine or Euclidian distance between representations of the activity and the respective playlist in vector space).

In an example, operation 232 further includes sorting the list of playlists 222 using the similarity value.

Operation 234 includes reordering the list of playlists 222 based on an amount of content of each playlist that is cached at the device 100. In an example, the amount of content is a total number of media content items cached at the device 100, a total size of the media content items cached at the device 100 (e.g., a number of gigabytes of content), a total length of media content items (e.g., a number of hours of content) cached at the device 100, a percentage of media content items cached at the device 100 (e.g., the percentage of media content items of a playlist that are cached), or combinations thereof. Beneficially, reordering the list of playlists 222 based on the amount of content cached at the device increases the likelihood that a user will select a playlist having content locally cached on the device 100. Selecting a playlist having content locally cached on the device 100 decreases battery and bandwidth consumption by the device 100 relative to playing a playlist having relatively less content locally cached on the device.

Operation 236 includes modifying the list of playlists 222 based on the descriptor data 216. In an example, operation 236 includes filtering the list of playlists 222 based on the descriptor data 216. In an example, operation 236 includes reordering the list of playlists 222 based on the descriptor data 216. In an example, the operation 236 includes removing one or more playlists from the list of playlists 222 responsive to the one or more playlists being unrelated to the descriptor data 216. In another example, operation 236 includes reordering the list of playlists 222 such that playlists that are more similar to the descriptor data 216 are ahead of the playlists that are less similar to the descriptor data 216. The modifying can be based on a title, description, or tag associated with a respective playlist or the media content items contained therein. For instance, as in operation 232, a similarity value is determined. Here, similarity value is determined based on the descriptor data 216 being contained within a title, description, or tag of a respective playlist. In other examples, the similarity value is determined based on a vector space representation of the descriptor data 216 and the respective playlist (e.g., the value is equal to the cosine or Euclidian distance between representations of the descriptor data 216 and the respective playlist in vector space). The list of playlists 222 is then modified based on the similarity value. In an example, the operation 236 is performed before the list of playlists 222 is received (e.g., from or based on an output of the natural language understanding system 106). In other examples, the operation 236 is performed after the list of playlists 222 is received (e.g., from or based on an output of the natural language understanding system 106).

In some examples, after operation 230 (and, in some examples, one or more of operation 232, operation 234, or operation 236), the flow of process 200 moves to operation 240. In other examples, the flow of process 200 moves to operation 250.

Operation 240 includes obtaining a phrase 242 and providing the phrase 242 as audio output. In an example, the phrase 242 includes words that provide an introduction before a predetermined portion of the list of playlists 222 is audibly output in operation 250. For instance, then phrase 242 can describe a soon-to-be performed operation, such as "now previewing your playlists". In some examples, the phrase 242 refers to the descriptor data 216, such as by "now previewing your blues playlists". In some examples, the phrase 242 includes the descriptor data. In some examples, the phrase 242 is received with the list of playlists 222 from the natural language understanding system 106. In other examples, the device 100 obtains the phrase 242 from a data store that stores phrases 242. In some examples, the phrase 242 is received as audio to be provided as output (e.g., as an audio file). In some examples, the phrase 242 is received from the server 150. In other examples, the phrase 242 is received as data that is usable to produce audio output, such as text data that, when provided to a text-to-speech engine, causes the phrase to be provided as audio output. After operation 240, the flow of the process 200 moves to operation 250.

Operation 250 includes traversing the list of playlists 222 and audibly outputting a predetermined portion 253 of each encountered playlist 251. In an example, traversing the list of playlists 222 includes iterating through each playlist of the list of playlists 222. In an example, the predetermined portion 253 includes a name of the encountered playlist 251 and the operation 250 includes operation 252. In an example, the predetermined portion 253 includes a playlist trailer of the playlist and the operation 250 includes operation 254.

Operation 252 includes outputting an explanation of the encountered playlist 251. Outputting the explanation often includes providing a text representation of the explanation to a text-to-speech engine to produce an audible output. In many examples, the explanation includes the title of the playlist. In many examples, the title is obtained from the list of playlists 222. In other examples, the title is obtained using an identifier of the encountered playlist. For instance, the device 100 obtains the title by querying the server 150 with an identifier of the encountered playlist 251. In other examples, the explanation includes a description of the playlist, such as a short note by a creator of the playlist that describes the playlist. In still other examples, the explanation includes a description of the content of the playlist, such as a description of the artists, albums, or genres of the media content items of the playlist.

Operation 254 includes playing a playlist trailer of the encountered playlist 251. The playlist trailer is a short preview of the encountered playlist 251. In many examples, the playlist trailer includes snippets of two or more media content items of a playlist. In some examples, the playlist trailer includes a single media content item that is stored as a file containing a concatenation of the snippets. In some examples, the playlist trailer is generated and stored by the device 100. In some examples, the playlist trailer is generated and stored by the server 150. Alternatively, the playlist trailer includes metadata that defines a playlist of snippets, such as data that identifies the media content items along with timestamps of the time in the media content items that identify the start (and in some examples the end) of the snippet. During playback of the playlist trailer, the device 100 then plays only the snippet portion of each of the media content items based on the metadata for the associated playlist trailer.

Playlist trailers can be generated in any of a variety of ways. In some examples, the playlist trailer is generated from a proper subset of the media content items of the playlist. In an example, the proper subset is selected using machine learning techniques, such as kernel method algorithms (e.g., support vector machines) or clustering techniques, to identify a proper subset of the media content items that are representative of the full set of media content items of the playlist (e.g., one media content item is selected from each cluster). Alternatively, the proper subset is generated by selecting randomly or otherwise a subset of the media content items. As another option, the subset is generated by selecting randomly or otherwise one media content item associated with each genre, era, or other characteristic represented in the playlist.

The snippets are selectable using various techniques. For instance, the snippet can be a portion at a beginning of a media content item, in the middle of a media content item, or at a random location of a media content item. In an example, a particularly catchy or memorable location is selected, such as a chorus of a song.

Operation 250, operation 252, and operation 254, are interruptible. For instance, while the device 100 can begin traversing the list of playlists 222 in operation 250, the device 100 need not finish traversing the list. For instance, a command may be received during the traversing of the playlists that interrupts the traversing. Such a scenario is described in relation to operation 256 and operation 260. In some examples, while traversing the list of playlists 222 in operation 250, a modification input 257 is received. In such examples, the operation 250 includes operation 256 and operation 258.

Operation 256 includes receiving the modification input 257. The modification input 257 is an input that describes a change to be made. In an example, device 100 audibly outputs the name of each encountered playlist 251 and, while doing so, receives the phrase "more like that one" over the human-machine interface 102 as modification input 257. The modification input 257 is processed with the natural language understanding system 106 to determine an action to take in response thereto. In this example, the natural language understanding system 106 determines that the phrase corresponds to modification input 257 and causes a modification in response thereto, such as described in relation to operation 258.

Operation 258 includes modifying the list of playlists 222 based on the modification input 257. The modifying takes various forms depending on the modification input. In many examples, the modifying includes filtering the list of playlists 222 using the modification input 257, such as removing playlists that meet or do not meet particular criteria specified in the modification input. For instance, where the modification input 257 includes the phrase "Only my 'The Rolling Stones' playlists", the list of playlists 222 is modified to remove playlists that do not include at least one media content item by the artist "The Rolling Stones". In other examples, the modifying involves obtaining a new list of playlists. For instance, responsive to determining that the list of playlists 222 would not include any playlists after the modification (e.g., the list of playlists 222 includes no blues playlists and the modification input 257 includes the phrase "only my blues playlists"), the modification input 257 is treated as a new request with the modification input 257 being descriptor data 216 and the flow of the process 200 moves back to operation 220.

During or after operation 250 (and, in some examples, during or after one or more of operation 252, operation 254, or operation 258), the flow of the process 200 moves to operation 260.

Operation 260 includes receiving a second input 262. In some examples, the second input 262 includes second utterance data 265 and the operation 260 further includes operation 264, which includes receiving the second utterance 265 over the human-machine interface 102 (e.g., the audio input device 104 thereof). In some examples, the second input 262 is a tactile input and operation 260 includes determining that a tactile input element was actuated (e.g., the tactile input device 103 of the human-machine interface 102). Following operation 260, the flow of the process 200 moves to operation 270.

Operation 270 includes determining that the second input 262 is associated with a playlist command 272. The playlist command 272 is a command associated with taking action respective to a playlist. In some examples, the playlist command 272 is a command associated with stopping the traversing of the playlists (e.g., as in operation 250). In some examples, the playlist command 272 is a command associated with playing a playlist. For instance, the playlist command 272 may include a playlist identifier 275 that describes a particular playlist to play.

Where the second input 262 is a tactile input, determining that the second input 262 is associated with a playlist command 272 includes determining that the second input 262 is associated with a user interface element (e.g., a button) associated with a playlist command. In an example, the tactile input device 103 of the device 100 includes a stop button and the device 100 is configured to treat input received over the stop button as a playlist command 272.

In an example, where the second input 262 includes the second utterance data 265, operation 270 includes operation 274 and operation 276.

Operation 270 includes transmitting the second utterance data 265 to the natural language understanding system 106 for processing. The natural language understanding system 106 processes the second utterance data 265 and provides an output based thereon. Following operation 274, the flow of the process 200 moves to operation 276.

Operation 276 includes receiving an indication that the second utterance data 265 is associated with a playlist command. In an example, the output of the processing by the natural language understanding system 106 includes the indication. Based on the received indication, the second input 262 is determined to be associated with a playlist command. The indication further includes details about the playlist command, such as the playlist identifier 275 if the playlist identifier 275 was specified in the second utterance data 265.

Following operation 270 (and, in some examples, operation 276), the flow of the process 200 moves to operation 280.

At operation 280, the traversing is stopped. For instance, the traversing is stopped responsive to determining the second input is associated with the playlist command 272. In some examples, the stopping is based on the playlist command 272. In some examples, where the predetermined portion 253 is being output, the output is stopped. In other examples, the output is allowed to finish. Following operation 280, the flow of the process 200 moves to operation 290.

Operation 290 includes selecting a selected playlist 292 based on the playlist command 272. In some examples, the operation 290 includes operation 294. In some examples, the operation 290 includes operation 296.

Operation 294 includes selecting a most-recently encountered playlist as the selected playlist 292. For example, selecting the most-recently encountered playlist includes selecting a playlist having a predetermined portion that is currently being audibly output. In some examples, such as where the predetermined portion of a previous playlist finished audibly outputting less than a predetermined threshold in the past, then the previous playlist is played.

Operation 296 includes selecting a playlist associated with the playlist identifier 275. In many examples, the playlist identifier 275 is a name of a playlist, and the operation 290 includes selecting a playlist having the name.

Following operation 290 (and, in some examples, operation 294 or operation 296), the flow of the process 200 moves to operation 298.

Operation 298 includes initiating playback of the selected playlist 292. In an example, the operation 298 includes obtaining a media content item from the selected playlist and playing the media content item. In examples, the media content item is obtained by receiving a stream of the media content item from the server 150. In another example, the media content item is obtained from storage local to the device 100.

Device Environment

Figure 3:
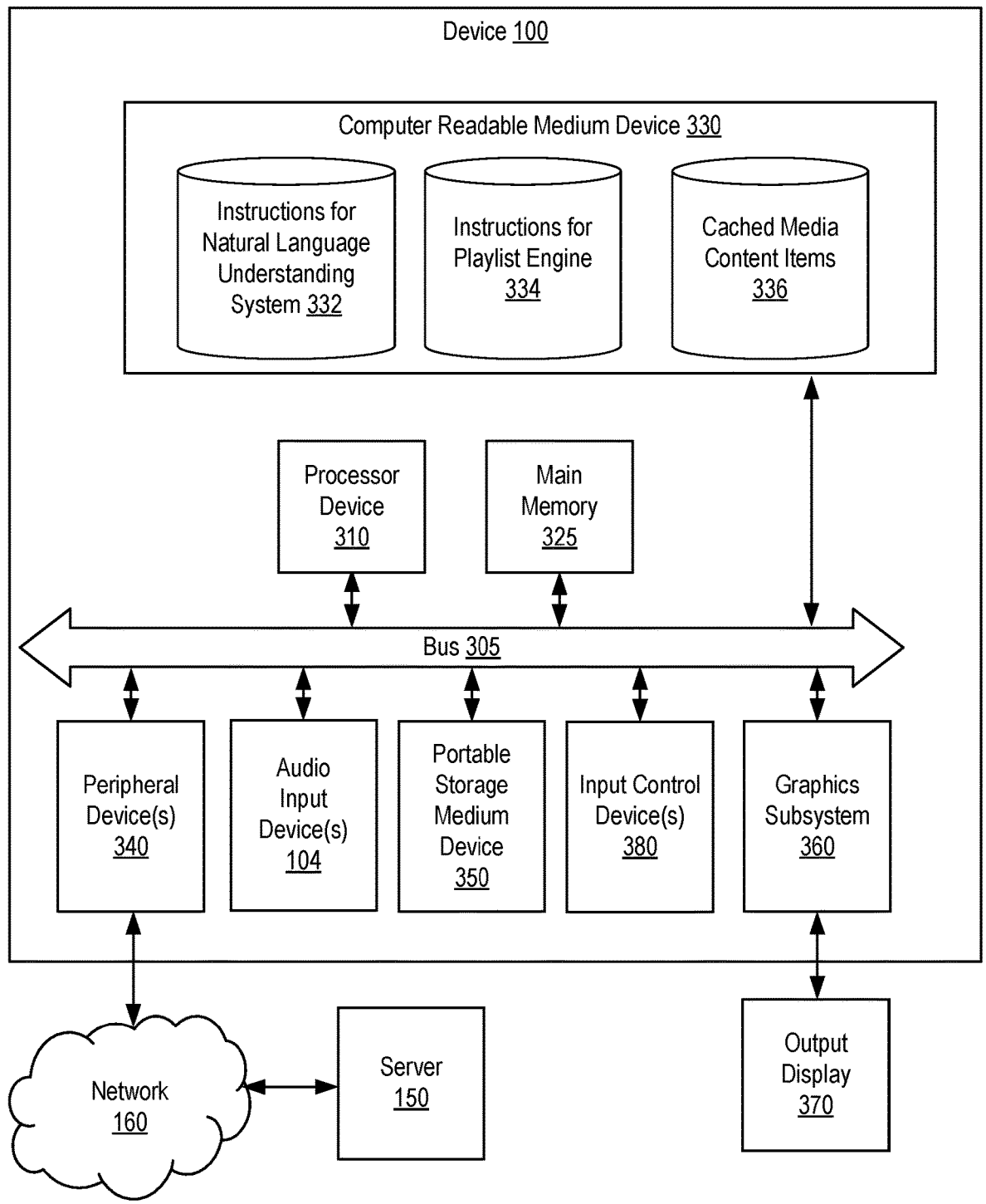
FIG. 3 is a block diagram showing an exemplary device constructed to realize one or more aspects of the example embodiments described herein.

FIG. 3 is a block diagram showing an exemplary device 100 constructed to realize one or more aspects of the example embodiments described herein.

As discussed above, the device 100 includes one or more processor devices 310. Also included are a main memory 325 and an interconnect bus 305. The one or more processor devices 310 may include, without limitation, a single microprocessor, or may include a plurality of microprocessors for configuring the device 100 for providing user-specific services and access based on an utterance. The main memory 325 stores, among other things, instructions and/or data for execution by the one or more processor devices 310. The main memory 325 may include banks of dynamic random access memory (DRAM), as well as cache memory.

The device 100 may further include a computer readable medium device 330, peripheral device(s) 340, audio input device(s) 104, portable non-transitory storage medium device(s) 350, input control device(s) 380, a graphics subsystem 360, and/or an output display 370 interface. For explanatory purposes, all components in the device 100 are shown in FIG. 3 as being coupled via the interconnect bus 305. However, the device 100 is not so limited. Elements of the device 100 may be coupled via one or more data transport means. For example, the one or more processor devices 310, and/or the main memory 325 may be coupled via a local microprocessor bus. The computer readable medium device 330, peripheral device(s) 340, portable storage medium device(s) 350, and/or graphics subsystem 360 may be coupled via one or more input/output (I/O) buses. The computer readable medium device 330 may be a nonvolatile storage device for storing data and/or instructions for use by the one or more processor devices 310. The computer readable medium device 330 may be implemented, for example, with a magnetic disk drive or an optical disk drive. In a software embodiment, the computer readable medium device 330 is configured for loading contents of the computer readable medium device 330 into the main memory 325. Memory may be embodied as one or more of computer readable medium device 330, main memory 325, or portable storage medium device 350.

Computer readable medium device 330 may additionally store one or more of the data structures, or function as one or more of the data stores described above. Computer readable medium device 330 may also include software that, when executed by the one or more processor devices 310, causes the one or more processor devices 310 to perform the features described above, such as the process 200. In the illustrated example, the computer readable medium device 330 stores instructions for a natural language understanding system 332, instructions for a playlist engine 334, and one or more cached media content items 336.

In an example, the instructions for a natural language understanding system 332 are instructions executable by the one or more processor devices 310 to provide some or all of the functionality of the natural language understanding system 106 described herein. In an example, the instructions for a playlist engine 334 are instructions executable by the one or more processor devices 310 to provide some or all of the functionality of the playlist engine 108 described herein. In an example, the one or more cached media content items 336 are media content items that are cached locally at the device 100.

The portable storage medium device 350 operates in conjunction with a nonvolatile portable storage medium, such as, for example, a solid state drive (SSD), to input and output data and code to and from the device 100. In some embodiments, the software for storing information may be stored on a portable storage medium, and may be inputted into the device 100 via the portable storage medium device 350. The peripheral device(s) 340 may include any type of computer support device, such as, for example, an input/output (I/O) interface configured to provide additional functionality to the device 100. For example, the peripheral device(s) 340 may include a network interface card for interfacing the device 100 with a network 160. The audio input devices 104 may be one or more devices configured to receive or obtain audio (e.g., from an environment around the device 100) and to provide a representation of the audio (e.g., as an audio clip or file) as output. The audio input device(s) 104 may include one or more microphones or other devices.

The input control device(s) 380 provide a portion of an interface for the device 100. The input control device(s) 380 may include a keypad and/or a cursor control device. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 100 may include the graphics subsystem 360 and the output display 370. The output display 370 may include a display such as a TFT (Thin Film Transistor), TFD (Thin Film Diode), OLED (Organic Light-Emitting Diode), AMOLED (active-matrix organic light-emitting diode) display, and/or liquid crystal-type displays (LCD). The displays can also be touchscreen displays, such as capacitive and resistive-type touchscreen displays.

The graphics subsystem 360 receives textual and graphical information from the processor device 310 over the bus 305, and processes the information for output to the output display 370.

Input control devices 380 can control the operation and various functions of device 100. Input control devices 380 can include any components, circuitry, or logic operative to drive the functionality of device 100. For example, input control device(s) 380 can include one or more processors acting under the control of an application.

Each component of the device 100 may represent a broad category of a computer component of a general and/or special purpose computer. Components of the device 100 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible, machine-readable or computer-readable medium may be used to program a computer system or other electronic device. The machine- or computer-readable medium may include, but is not limited to, magnetic disks, optical disks, magneto-optical disks, or other types of computer-/machine-readable media suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, fieldprogrammable gate arrays, or by interconnecting an appropriate network of conventional component circuits.

Some embodiments include a computer program product. The computer program product may be a storage medium or media having instructions stored thereon or therein that can be used to control or cause a computer to perform any of the procedures of the example embodiments of the invention. The storage medium may include, without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include, without limitation, device drivers, operating systems, and user applications. Ultimately, such computer-readable media further include software for performing example aspects of the invention, as described above.

Included in the programming and/or software of the system are software modules for implementing the procedures described above.

The device 100 may be connected over the network 160 to one or more servers 160 or other remote devices. The one or more servers 160 can include one or more components described above in relation to device 100, including a computer readable medium device and a processor device.

Various operations and processes described herein can be performed by the cooperation of two or more devices, systems, processes, or combinations thereof.

Natural Language Understanding Process

Figure 4:
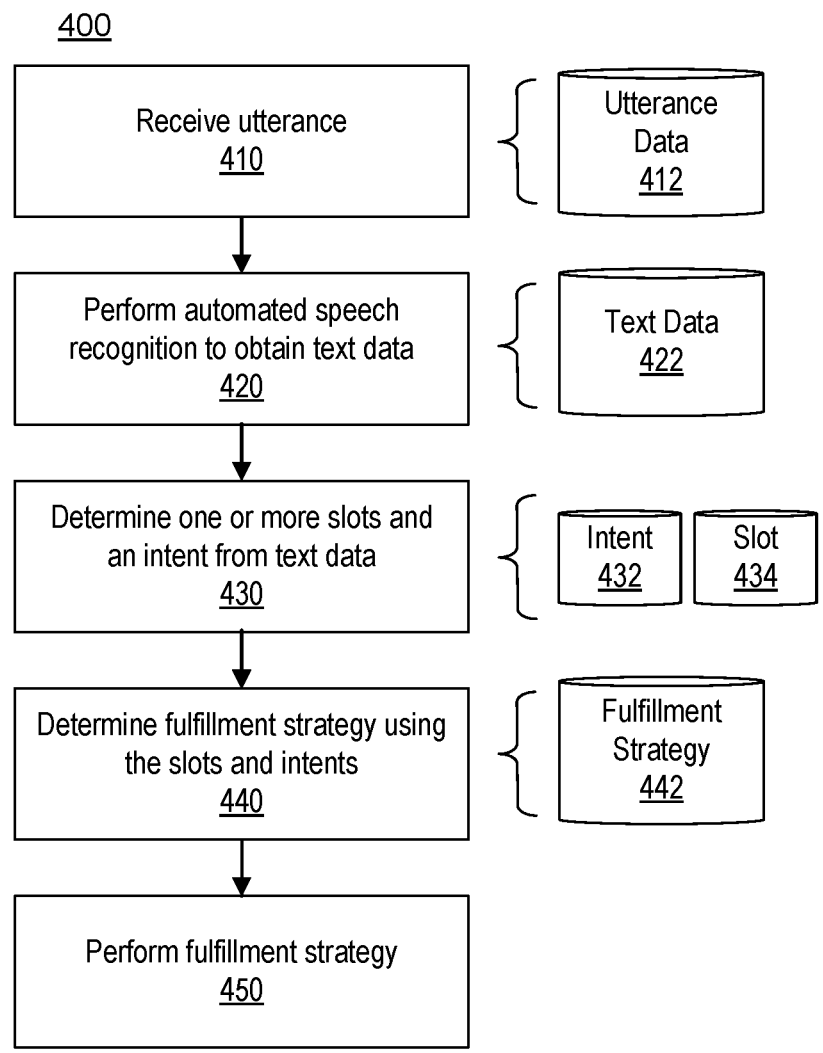
FIG. 4 illustrates an example process used by the natural language understanding system for performing a fulfillment strategy based on a received utterance.

FIG. 4 illustrates an example process 400 used by the natural language understanding system 106 for performing a fulfillment strategy based on a received utterance. As described in this example, the server 150 operates the natural language understanding system 106, and the device 100 provides the utterance 14 to the server 150 for processing at the natural language understanding system 106. This is for example purposes only, and other configurations are possible. For instance, the natural language understanding system 106 is local to the device 100. The process begins with operation 410.

Operation 410 includes receiving utterance data 412 (e.g., from the device 100 or the human-machine interface 102 thereof). The utterance data 412 is data describing the utterance 14. In many examples, the utterance data is an audio recording that contains the utterance 14 being spoken. In some examples, the utterance data 412 is received as an entire audio data file. For instance, the device 100 buffers the utterance data 412 as the utterance data 412 is obtained from the audio input device 104. The buffered utterance data 412 is then sent to the server 150 for processing. In other instances, the device 100 streams the utterance data 412 to the server 150 in real-time as the utterance data 412 is received from the audio input device 104. In an example, the utterance data 412 is stored (e.g., by the server 150) in a data store after the utterance data 412 is received. After the utterance data 412 is received, the flow moves to operation 420.

Operation 420 includes performing automated speech recognition on the utterance data 412 to obtain text data 422. In many examples, performing automated speech recognition includes providing the utterance data 412 as input to an automated speech recognition system and receiving the text data 422 as output from the automated speech recognition system. Automated speech recognition can be performed using any of a variety of techniques (e.g., using hidden Markov models or neural networks). Examples of automated speech recognition systems include CMU SPHINX, maintained by CARNEGIE MELLON UNIVERSITY, and DEEPSPEECH, maintained by the MOZILLA FOUNDATION. After the text data 422 is obtained from the automated speech recognition system, the flow moves to operation 430.

Operation 430 includes determining a slot 434 and an intent 432 from the text data 422. The slot 434 is a key-value pair that describes a portion of the text data 422 having a specific meaning. The intent 432 describes a general intent of the text data 422. As a particular example, if the text data 422 were "play the song Thriller" as input, the intent 432 is "play" and the slot 434 would be the key-value pair {song: Thriller}. Although the example includes just one slot 434 and one intent 432, the output of operation 430 can be more than one slot 434 and more than one intent 432. There are also instances, where there is an intent 432 but no slot 434. For instance, performing operation 430 where the text data 422 is "play" would result in the intent 432 being "play", but would not result in any slots 434 (e.g., the text data 422 does not include a description of what to play). In other instances, there are slots 434 but no intent. For instance, performing operation 430 where the text data 422 is "All Along the Watchtower by Jimi Hendrix" would result in two slots 434 (e.g., {Song: All Along the Watchtower, Artist: Jimi Hendrix}) but no intent 432 (e.g., the text data 422 does not include a description of what to do with the song and artist, such as search, play, or save).

In an example, the operation 430 is performed by a natural language understanding model that is trained to identify the slot 434 and intent 432 for the text data 422 provided as input. The natural language understanding model can be implemented in a variety of ways, including using a state vector machine or a conditional random fields model, among others. With the intent 432 and the slots 434 determined, the flow moves to operation 440.

Operation 440 includes determining a fulfillment strategy 442 using the slot 434 and the intent 432. The fulfillment strategy 442 is a course of action to take which is typically associated with execution of a command or service associated with the intent 432. For instance, where the intent 432 is a play intent, the fulfillment strategy 442 is a play fulfillment strategy and involves the execution of a play command. In an example, there is a fulfillment manager and the operation 440 includes the fulfillment manager selecting the fulfillment strategy 442 from among a plurality of fulfillment strategies. In an example, the fulfillment manager follows a decision tree based the intent 432 and the slot 434. In another example, the fulfillment strategy 442 defines requirements (e.g., a play fulfillment strategy may require a play intent) and the fulfillment manager selects the fulfillment strategy 442 from among the fulfillment strategies based on requirements being met or unmet. Once the fulfillment strategy 442 is selected, the flow moves to operation 450.

At operation 450, the fulfillment strategy 442 is performed. For example, where the fulfillment strategy 442 is a play fulfillment strategy 442, a media content item associated the slot 434 is selected and playback of the media content item is initiated. In another example, the fulfillment strategy 442 is a list playlists strategy that involves selecting one or more playlists and providing the list as output.

What is claimed is:

1. A method comprising:
receiving, by a human-machine interface of a device, first utterance data including descriptor data;
determining the first utterance data includes a request to provide a list of playlists;
receiving the list of playlists, the list of playlists being associated with the first utterance data;
modifying the list of playlists based on the descriptor data, thereby resulting in a modified list of playlists; and
audibly outputting an introduction including a description of each playlist of the modified list of playlists, the description of each playlist describing: (i) one or more artists, (ii) one or more albums, (iii) one or more genres, or (iv) any combination of (i), (ii), and (iii).

2. The method of claim 1, wherein modifying the list of playlists includes reordering the list of playlists based on the descriptor data.

3. The method of claim 2, wherein modifying the list of playlists includes reordering the playlists in the list of playlists such that playlists that are more similar to the descriptor data are ahead of the playlists that are less similar to the descriptor data.

4. The method of claim 1, wherein modifying the list of playlists includes filtering the list of playlists based on the descriptor data.

5. The method of claim 1, further comprising receiving, by the human-machine interface of the device, modification input that includes new descriptor data.

6. The method of claim 1, further comprising:
receiving, by the human-machine interface of the device, second utterance data;
determining the second utterance data includes a playlist command; and
executing the playlist command.

7. The method of claim 1, wherein the descriptor data includes one or more of a title, the description, or tag of a respective playlist.

8. A non-transitory computer-readable medium having stored thereon sequences of instructions, the sequences of instructions including instructions that when executed by a computer system causes the computer system to perform:
receiving, by a human-machine interface of a device, first utterance data including descriptor data;
determining the first utterance data includes a request to provide a list of playlists;
receiving the list of playlists, the list of playlists being associated with the first utterance data;
modifying the list of playlists based on the descriptor data, thereby resulting in a modified list of playlists; and
audibly outputting an introduction including a description of each playlist of the modified list of playlists, the description of each playlist describing: (i) one or more artists, (ii) one or more albums, (iii) one or more genres, or (iv) any combination of (i), (ii), and (iii).

9. The non-transitory computer-readable medium of claim 8, wherein modifying the list of playlists includes reordering the list of playlists based on the descriptor data.

10. The non-transitory computer-readable medium of claim 9, wherein modifying the list of playlists includes reordering the playlists in the list of playlists such that playlists that are more similar to the descriptor data are ahead of the playlists that are less similar to the descriptor data.

11. The non-transitory computer-readable medium of claim 9, wherein modifying the list of playlists includes filtering the list of playlists based on the descriptor data.

12. The non-transitory computer-readable medium of claim 8, further having stored thereon a sequence of instructions for causing the computer system to perform receiving, by the human-machine interface of the device, modification input that includes new descriptor data.

13. The non-transitory computer-readable medium of claim 8, further having stored thereon a sequence of instructions for causing the computer system to perform:
receiving, by the human-machine interface of the device, second utterance data;
determining the second utterance data includes a playlist command; and
executing the playlist command.

14. The non-transitory computer-readable medium of claim 8, wherein the descriptor data includes one or more of a title, the description, or tag of a respective playlist.

15. A device, comprising:
a human-machine interface;
one or more processor devices; and
a computer readable medium device coupled to the one or more processor devices and having instructions thereon that, when executed by the one or more processor devices, cause the one or more processor devices to:
receive, by the human-machine interface of the device, first utterance data including descriptor data;
determine the first utterance data includes a request to provide a list of playlists;
receive the list of playlists, the list of playlists being associated with the first utterance data;
modify the list of playlists based on the descriptor data, thereby resulting in a modified list of playlists; and
audibly output an introduction including a description of each playlist of the modified list of playlists, the description of each playlist describing: (i) one or more artists, (ii) one or more albums, (iii) one or more genres, or (iv) any combination of (i), (ii), and (iii).

16. The device of claim 15, wherein modifying the list of playlists includes reordering the list of playlists based on the descriptor data.

17. The device of claim 16, wherein modifying the list of playlists includes reordering the playlists in the list of playlists such that playlists that are more similar to the descriptor data are ahead of the playlists that are less similar to the descriptor data.

18. The device of claim 15, wherein modifying the list of playlists includes filtering the list of playlists based on the descriptor data.

19. The device of claim 15, having additional instructions stored thereon that further cause the one or more processor devices to receive modification input that includes new descriptor data.

20. The device of claim 15, wherein the descriptor data includes one or more of a title, the description, or tag of a respective playlist.

* * * * *